United States Patent [19]
Ando et al.

[11] 3,831,913
[45] Aug. 27, 1974

[54] APPARATUS FOR DIRECT IRON REDUCTION

[75] Inventors: Ryo Ando; Kokichi Hagiwara, both of Yokohama, Japan

[73] Assignee: Nippon Kokan Kabushiki Kaisha, Tokyo, Japan

[22] Filed: Aug. 8, 1972

[21] Appl. No.: 278,820

[30] Foreign Application Priority Data
Aug. 12, 1971 Japan............................ 46-61270

[52] U.S. Cl.................... 266/24, 266/18, 75/36, 432/117
[51] Int. Cl............................................ F27b 7/28
[58] Field of Search ...................... 75/33–36; 266/9, 18, 20, 24; 432/58, 103, 106, 113, 117

[56] References Cited
UNITED STATES PATENTS

| 1,477,517 | 12/1923 | Newberry | 432/117 |
| 2,091,850 | 8/1937 | Gohre | 432/117 |
| 2,792,298 | 5/1957 | Freeman | 75/33 |
| 3,182,980 | 5/1965 | Helfrich | 432/117 |
| 3,224,871 | 12/1965 | Collin | 75/36 |
| 3,539,336 | 11/1970 | Urich | 266/20 |
| 3,671,027 | 6/1972 | Frans | 432/117 |

*Primary Examiner*—Gerald A. Dost
*Attorney, Agent, or Firm*—Flynn & Frishauf

[57] ABSTRACT

In a direct iron reduction process of the type utilizing a rotary kiln, oxidizing gas is blown into the bed in the rotary kiln so as to increase the temperature of the bed and to increase the speed of movement of the gas in the bed.

The rotary kiln used in this method has a cross-sectional configuration in the form of a ratchet wheel and is provided with a plurality of inlet ports for oxidizing gas at the roots of the teeth of the ratchet wheel. Partially reduced composite pellets containing iron ore and a carbonaceous material are admitted into one end of the rotary kiln which is provided with a fuel burner at the opposite end. The rotary kiln is further provided with a heat exchanger at said one end to heat the oxidizing gas by the exhaust gas from the rotary kiln.

15 Claims, 8 Drawing Figures

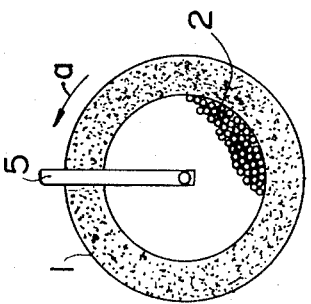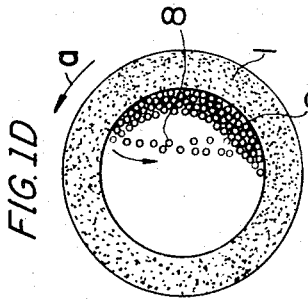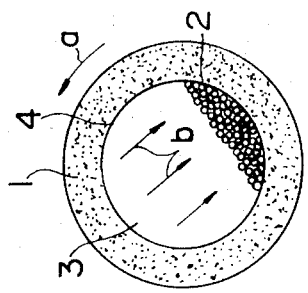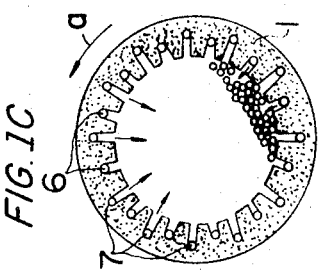

FIG. 5

APPARATUS FOR DIRECT IRON REDUCTION

BACKGROUND OF THE INVENTION

This invention relates rotary kiln for use in a to a direct iron reduction process.

Although numerous direct iron reduction process have been proposed in the past, only a limited number of them has been used commercially. According to the type of the apparatus utilized, the direct iron reduction processes are classified into (1) a rotary kiln process, (2) a shaft furnace process, (3) a fluidized bed process, (4) a travelling grate process and (5) a retort process. The rotary kiln method is now most widely used.

The possibility and advantage of the direct iron reduction process have attracted keen interest in the art since the source of coal for manufacturing blast furnace coke, especially the caking coal has become exhausted, and hence the cost of the raw material coal is increasing, and since steel making by electric furnaces seems prospective owing to the lowering cost of electric power generation by nuclear reactors.

Through a comparison of various types of the prior art direct iron reduction processes we have found that the rotary kiln process is most advantageous and have contemplated the provision of a new and improved rotary kiln process.

In the rotary kiln process now widely used, the length of the kiln of a large scale installation is about 200 meters. There are already big sized rotary kilns actually in commercial use but still they pose some problems. It is often said that its productivity is still low. Such an opinion is however, not absolute but relative. This is especially true when one considers the commercial value of the rotary kiln for use in the direct iron reduction process. For example, a modern DL type sintering machine has a suction area of 400 to 500 m$^2$ and a daily output of 15,000 tons. Also a blast furnace having a volume of 4,000 m$^3$ has been built, and a blast furnace of a daily output of 10,000 tons is now a reality. Thus, the production capacity of the unit facilities of smelter has now been increased to 10,000 t/day and the production capacity of oxidized pellets of a rotary kiln has also been increased to 7,000 t/day. However, the maximum production capacity of a reliable rotary kiln designed for use in the direct iron reduction process is at most 600 t/day, so that it is highly desirable to increase the production capacity of the rotary kiln to at least 3,000 t/day, preferably 5,000 t/day.

Before discussing the novel rotary kiln, some of the prior rotary kilns for use in the direct iron reduction process will be described with reference to FIGS. 1A to 1D of the accompanying drawing.

FIG. 1 shows a cross-sectional view of a typical rotary kiln comprising a refractory lining 1 applied onto the inner surface of an steel plate shell. A charge 2 is loaded in the kiln which is rotated in the counterclockwise direction as shown by an arrow $a$. Due to the heat generated in the cavity 3 as for example by the combustion of fuel, the inner wall 4 of the lining 1 is heated and the heat is radiated from the inner wall 4 to heat the charge 2 as shown by arrows $b$. Although the portion of the charge 2 in contact with the inner wall 4 is also heated by heat conduction from the inner wall, the heating by conduction is much smaller than by radiation.

This is the principal cause for the low thermal efficiency of the rotary kiln. Further, recovery of the waste heat of the rotary kiln presents a serious problem, and a number of heat recovering systems have been proposed. In the rotary kiln of the type shown in FIG. 1A, a burner is mounted at the discharge end of the kiln to heat the entire length thereof. Accordingly, the temperature of the bed decreases substantially linearly from the discharge end toward the charge end.

FIG. 1B shows a rotary kiln equipped with a so-called shell burner 5 and is typically operated according to the SL/RN process which is especially suitable for the direct iron reduction process since provision of the burner 5 enables to maintain the temperature of the atmosphere in the kiln at a high level along the entire length thereof excepting the charge end. Accordingly, it is possible to increase the temperature of the bed more rapidly than with the kiln shown in FIG. 1A. However, the transfer of heat at any cross-section is the same as the kiln shown in FIG. 1A. Although increased temperature of the exhaust gas tends to increase the waste heat quantity, since in the direct iron reduction process, different from the calcination of cement, a large quantity of heat is consumed for reduction, the rate of the heat loss caused by the exhaust gas is not so large.

FIG. 1C shows a rotary kiln proposed by Allis Chalmers which does not use shell burners. The method of using shell burners is an efficient method, but there are many problems including the difficulty in the maintenance and operation of the kiln caused by the fact that the burners are mounted to be operated in high temperature gas and by the accretion of the feed on the inner wall of the kiln at portions where the shell burners are supported. Accretion of the feed is the greatest problem in connection with the efficient operation of the rotary kiln. Therefore use of such shell burners is not advantageous. More particularly, in the rotary kiln shown in FIG. 1C, a plurality of pipes 6 and 7 extend axially through the lining 1 of the rotary kiln with their outlet opened at the inner surface of the lining to supply air and reducing gas into the rotary kiln. In the example shown, pipes 7 supply air and pipes 6 the reducing gas. Although not shown in the drawing, the kiln and a stationary hood at the charge end are arranged such that the reducing gas is supplied only to the pipes 6 with their openings positioned at a portion where there is the bed but the reducing gas is not supplied to the pipes 6 with their openings positioned at a portion where there is no bed. Conversely, the air is not supplied to the pipes 7 with their openings positioned at the portion where there is the charge. Since the pipes embedded in the lining 1 are heated, the air and the reducing gas are slightly preheated. This type of rotary kiln is characterized in that it can provide substantilly the same function as the kiln equipped with the shell burners and that the reduction is enhanced by the admission of the reducing gas. However, it is to be particularly pointed out that the reducing gas is admitted into the portion of the rotary kiln where there is the charge. The reduction of FeO to Fe is an endothermic reaction so that the admission of the not yet sufficiently preheated reducing gas into the rotary kiln results in the decrease in the temperature of the charge. Even when a strongly reducing atmosphere is used, the productivity would be decreased.

As will be described later, according to the invention, an oxidizing gas is admitted to increase further the temperature of the charge.

FIG. 1D shows a rotary kiln in which when a charge falls down by rotation, the same action as a fluidized bed is exerted on the charge. Generally, a fluidized bed enhances the reaction. With this method, the number of revolutions of the kiln is increased so as to cause a portion of the charge 8 to fall down from the upper side of the inner wall of the lining 1 which is different from the conventional rotary kiln rotated at a lower speed wherein a portion of the charge slides down along the inner wall. Such a falling portion of the charge 8 can be formed by setting the number of revolutions of the kiln to a value slightly lower than the critical speed. Ordinary pulverizers such as rod mills and ball mills operate with such a speed.

In this type of rotary kiln, heat transfers in a quite different manner. More particularly, while falling down, the charge particles absorb a large quantity of heat, which is radically different from the conventional rotary kiln where the area for transmitting heat to the charge is limited. However, it is difficult to rotate a large rotary kiln at such a high speed. In a pulverizer such as a rod mill and a ball mill, the body of the pulverizer which corresponds to the rotary kiln is supported by trunnions and the portion of the body supported by the trunnions is received in a bearing. Usually, such a pulverizer operates at room temperature so that it can be constructed to operate at a high degree of accuracy. However, the ordinary rotary kiln is constructed such that tires secured to the kiln rotate on supporing rollers. Moreover, the body of the rotary kiln expands and contracts under the effect of heat. Thus, it is difficult to rotate such a structure at a high speed.

The above described flow of the charge particles can also be provided by using lifting plates secured to the inside of the rotary kiln. However, such lifting plates are required to withstand high temperature and cause the charge to deposit thereon. For this reason, different from the case of a dryer using a low temperature rotary kiln, it is impossible to use such lifting plates in a rotary kiln for the direct iron reduction process.

Accordingly, it is an object of this invention to provide an improved rotary kiln for use in the direct iron reduction process which can eliminate various disadvantages of the prior art rotary kilns described hereinabove.

Another object of this invention is to provide a novel method of direct iron reduction which can increase the productivity of the rotary kiln.

A still further object of this invention is to provide improved apparatus for use in the direct iron reduction process comprising a combination of an improved rotary kiln and a fluidized bed for supplying partially reduced raw material pellets to the rotary kiln, thereby increasing the productivity and thermal efficiency of the apparatus.

SUMMARY OF THE INVENTION

According to the present invention there is provided a rotary kiln for use in a direct iron reduction process, said rotary kiln having a cross-sectional configuration in the form of a ratchet wheel and being provided with a plurality of inlet ports for oxidizing gas at the roots of the respective teeth of the ratchet wheel.

According to a further aspect of the invention, there is provided apparatus for use in a direct iron reduction process, comprising a rotary kiln including a plurality of inlet ports which are disposed to admit oxidizing gas in the circumferential direction along the inner wall of the rotary kiln, a fuel burner at one end of the rotary kiln, a heat exchanger located at the opposite end for preheating the oxidizing gas, an inlet for partially reduced raw material pellets at the opposite end and a discharge port for the reduced pellets at said one end; a preheater for preheating and drying the raw material pellets; a fluidized bed connected between the inlet of the rotary kiln and the preheater; means for supplying reducing gas into the fluidized bed for partially reducing the preheated raw material pellets; and means for supplying the reducing gas exhausted from the fluidized bed into the rotary kiln at said one end.

The composite pellets comprise a mixture of iron ore and a carbonaceous substance.

BRIEF DESCRIPTION OF THE DRAWINGS.

The invention can be more fully understood from the following detailed description taken in conjunction with the accompanying drawings in which:

FIG. 1A through 1D show cross-sectional views of various types of the prior art rotary kilns for use in the direct iron reduction process;

FIG. 2 shows a cross section of a rotary kiln embodying the invention;

FIG. 3 shows a cross section of a modified rotary kiln of this invention;

FIG. 5 is a diagrammatic representation of apparatus comprising the combination of the rotary kiln shown in FIGS. 3 and 4 and a fluidized bed for partially reducing the raw material composite pellets.

DESCRIPTION OF THE PREFERRED EMBODIMENTS

Figure 4:
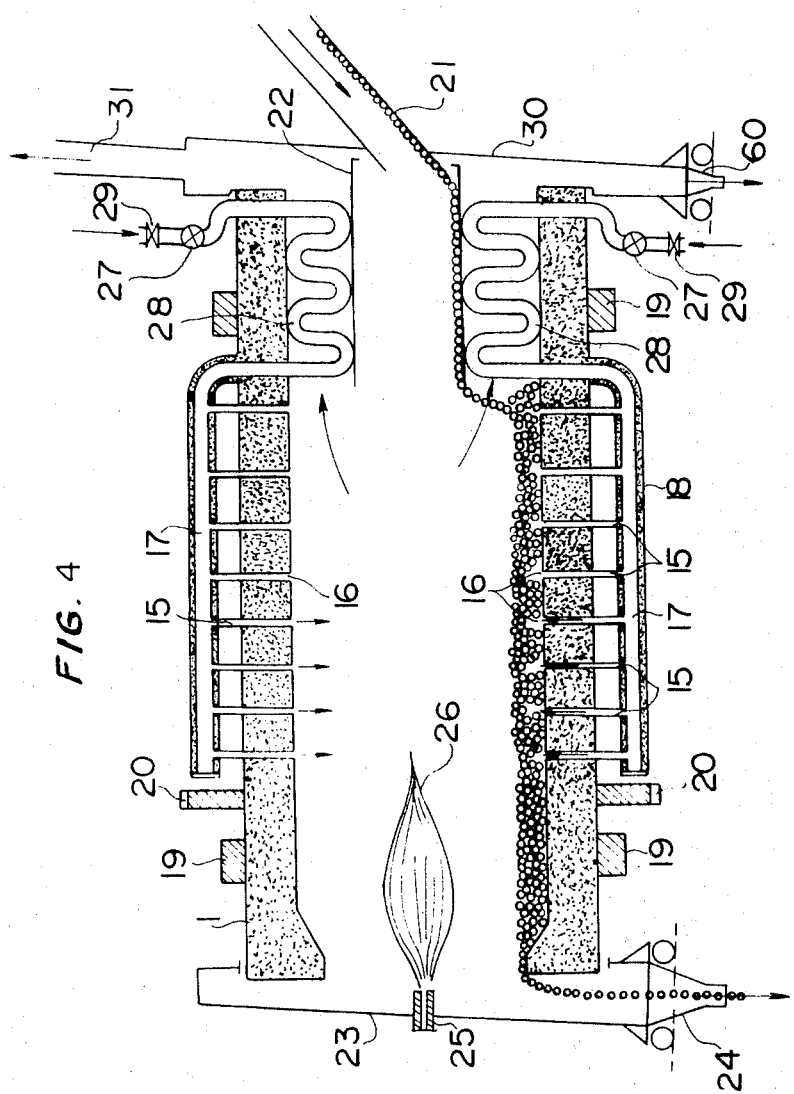
FIG. 4 shows a longitudinal section of the rotary kiln shown in FIG 3.

FIG. 2 shows a cross-sectional view of an improved rotary kiln embodying the invention. As shown, the rotary kiln comprises a perforated inner steel plate shell 10, an outer shell 11 and a lining 9, applied on the inner surface of the inner shell, a portion or all of the lining being fabricated with porous bricks. The kiln is rotated in the direction of arrow a. The annular space between the inner and outer shells is divided into a plurality of axial chambers 13 by means of partition walls 12, and each chamber 13 is provided with an air inlet pipe 14 including a valve (not shown) for adjusting the quantity of air. In the direct iron reduction process with a rotary kiln, a mixture of iron ore and a carbonaceous reducing agent is generally charged into the rotary kiln. The present process is characterized in that air is blown into the charge to burn the carbonaceous substance thereby producing high temperature CO gas to elevate the temperature inside the bed, and that at portions of the inner wall of the lining where there is no charge, combustion of CO occurs to form $CO_2$ thus increasing the efficiency of heat radiation. In the prior art rotary kiln shown in FIG. 1C, these advantageous merits can not be expected because the number of pipes is relatively small. Moreover, as the shell of the rotary kiln shown in FIG. 2 has a double walled construction, the air passing through chambers 13 defined between the inner and outer shells is efficiently preheated whereby the heat loss from the kiln can be decreased.

This method, however, involves a problem that the carbonaceous substance and the ore of the bed segregate from each other due to the fact that the ore is distributed as a layer close to the inner wall of the lining owing to its large specific gravity. For this reason, there is a fear that already reduced ore tends to be reoxidized. However, this difficulty can be greatly alleviated by combining the ore and carbonaceous substance into composite pellets. Although, heat loss from the body of the rotary kiln can be decreased by the preheating of air, it is difficult to recover the heat of the exhaust gas which is a factor that causes larger heat loss.

FIG. 3 shows a cross section of a modified rotary kiln which has been improved to eliminate the difficulties of the rotary kiln shown in FIG. 2. In this modification, the lining 1 is fabricated with bricks having air inlet openings 15 of small diameter instead of using porous bricks. The cross-sectional configuration of the lining 1 resembles that of a ratchet wheel with the openings 15 opened at 16 at the roots of respective teeth. The air is blown into the kiln in the tangential direction as shown by arrows c so as to form a small race way in front of each opening in the same manner as the tuyere of the blast furnace. Accordingly, at the portion of the bed around the race way $CO_2$ gas is largely converted into CO. Although, due to the rotation of the kiln, the charge passes through the race way, since its pass time is short, there is no problem. This is especially true when a charge in the form of composite pellets is used.

The air blown into the portion where there is no charge also flows along the inner wall of the lining, the radiation efficiency of the flame created by the combustion of the mixture of fuel and air is sufficiently high. Each air opening 15 is connected to a pipe 17 on the outside of the rotary kiln. The pipes 17 are covered by heat insulating material 18 because they pass preheated air.

FIG. 4 shows a longitudinal section of the rotary kiln shown in FIG. 3. As shown, the rotary kiln is provided with tires 19 which are mounted on rollers on a foundation, not shown. The rotary kiln is driven by an electric motor, not shown, through a ring gear 20. The raw material is charged into the kiln through a chute 21 provided at one end thereof. The raw material to be charged may comprise iron ore to be reduced, more specifically, calcined pellets, green or not calcined pellets, green compound pellets or lumps of ore, a carbonaceous reducing agent such as coal or coke and if necessary, a desulfurization agent such as lime stone and dolomite.

The raw material is introduced into the lining 1 via a small cylinder 22 contained in the rotary kiln. When the kiln is rotated the raw material is advanced meandering to the discharge end where it overflows into a cooler (not shown) through a hopper 24 located below an end cover 23. A central burner 25 is mounted at the center of the end cover 23 to eject a mixture of fuel such as heavy oil and air. The flame 26 generated by the combustion of the fuel supplies heat to the portion of the rotary kiln near its discharge end and maintains reducing atmosphere. Air supplied by blowers 27 is passed through serpentine pipes 28 and the above described pipes 17 and is then distributed among air inlet openings 15. The air supplied to inlet openings 15 flows into the kiln through ports 16 in the circumferential direction. The quantity of the air is adjusted by valves 29 on the inlet sides of blowers 27. The serpentine pipes 28 are arranged to exchange heat with the exhaust gas from the kiln at a high efficiency. The exhaust gas passes through an annular space between cylinder 22 and the inner wall of the lining 1 into a chimney 31 on the upper end of the end cover 30. Relatively coarse dust is collected in a hopper 60 and is discharged to the outside of the rotary kiln. No opening 16 is formed near the discharge end of the kiln so as to maintain the reducing atmosphere.

The rotary kiln described above greatly improves the productivity over the prior art rotary kiln.

The method of pretreatment of the raw material, that is, the prereduction of the charge before it is supplied to chute 21 is carried out in the following manner.

The reason for the wide use of rotary kilns lies in the improvement of the heat recovery from the exhaust gas. In the direct iron reduction process since a large quantity of heat is required for the reduction of the ore, the absolute quantity of heat carried away by the exhaust gas is relatively small but it is an important problem to be solved.

Although various methods of pretreatments of the raw material to be charged in the rotary kiln have been proposed including a method of using a shaft furnace and a method of using a travelling grate, but there have been made only a few proposals utilizing a fluidized bed.

Where a fluidized bed is used for pretreatment, the post treatment is done with a fluidized bed and a shaft furnace. The method of using a multi-stage fluidized bed is old. An arrangement including a fluidized bed followed by a shaft furnace has also been proposed by Professor Kunii of Tokyo University. In any event, there was no arrangement including a fluidized bed followed by a rotary kiln. Recently in the cement industry, the kiln has been changed from Lepol to Humboldt type but the Humboldt method is also a floatation type and not of the fluidized bed type.

Unexpectedly, the invention proposes to use a method of pretreatment utilizing the fluidized bed in combination with the novel rotary kiln described above.

Although the reason why the combination of a fluidized bed and a rotary kiln has not been used is not clearly understood, the reason may be attributable to contradictory requirements of the fluidized bed and the rotatary kiln, that is in the former the particle size of the raw material should be fine, whereas in the latter the particle size should be coarse in order to prevent formation of the "rings" which are the most serious problem in the rotary kiln. Where the treating temperature is low there is no difficult problem. The above described contradictory requirements present a serious problem for the direct reduction making process. For this reason, it has been said that it is impossible to use a fluidized bed for the treatment of iron ore so that it has been the practice to reduce the iron ore at a low temperature by using hydrogen as the reducing gas. For this reason it can be said that above described Professor Kunii's proposal is novel. According to this proposal, instead of using a fine powder, composite pellets are used. Where a fine powder is used in the fluidized bed there is a tendency of sintering but use of the composite pellets eliminates this tendency.

Of course, the reaction speed becomes faster as the grain size decreases, in other words, with large diameter particles, such as pellets the reaction speed decreases. But such reduction in the reaction speed can be compensated for by the use of the composite pellets. It may be considered that application of this technique has not been proposed because such proposal has been made only recently. In this proposal a shaft furnace is selected for the secondary treatment. Generally, in a fluidized bed of a single stage, some of the particles stay in the bed for an interval longer than the mean value and other particles stay for an interval shorter than the mean value so that the degree of reduction varies over a considerably wide range. Accordingly, in order to obtain a high degree of reduction with a single stage fluidized bed it is desirable to install a device having a piston flow characteristic in the suceeding stage. Of course a shaft furnace can satisfy this requirement, and a rotary kiln also has the piston flow characteristic. Thus, it can be said that absence of the proposal of a direct iron reduction process utilizing a combination of a fluidized bed and a rotary kiln is incomprehensible.

One of the reasons that Professor Kunii has selected a shaft furnace is believed to be that he has intended to use the shaft furnace for cooling. The other reason would be that he wanted to use the naturally formed bed of the pellets as the perforated plates supporting the fluidized bed.

As above described, it is advantageous to use composite pellets in the novel kiln. In this case, it is preferred to use composite pellets in a Kunii type fluidized bed, whereby the composite pellets which still contain free carbon without losing their properties after they are passed through the fluidized bed for pre-reducing are charged into the rotary kiln. It can be said that such a condition is suitable for the present invention. For the prereducing process which is performed at a low temperature the perforated plate supporting the fluidized bed is not necessarily substituted by the composite pellet. Where it is desirable to install a piston flow device subsequent to the pre-reducing step the method of this invention is an ideal one that can be provided with a fluidized bed essentially consisting of the composite pellets for carrying out the pretreatment.

Figure 5:
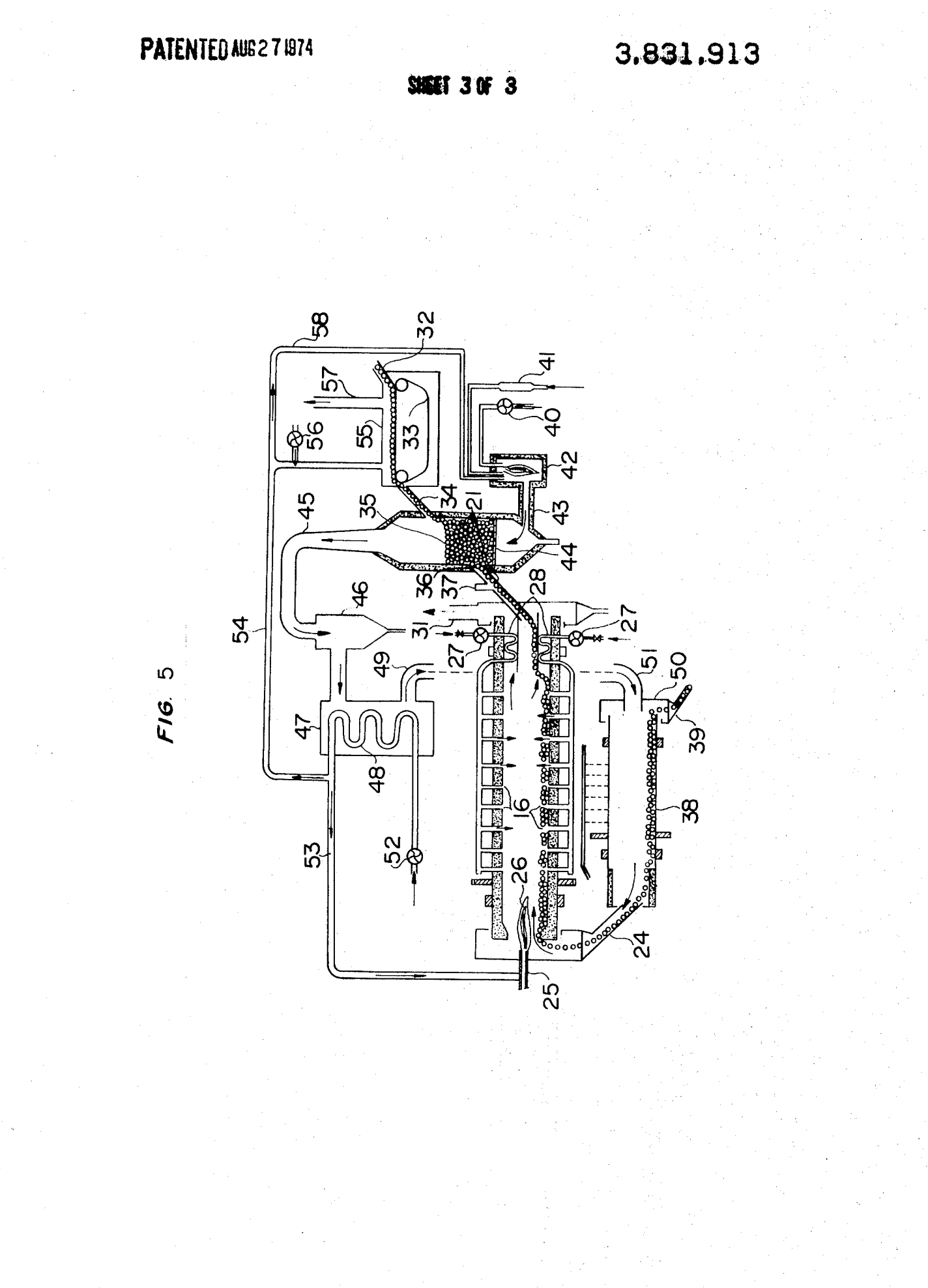

FIG. 5 is a diagrammatic representation of apparatus for carrying out the novel method of direct iron reduction comprising a combination of the rotary kiln shown in FIGS. 3 and 4 and a fluidized bed.

With reference first to the flow path of the charge, the iron ore, in the form of the composite pellets in this example, is supplied into a travelling grate type drying and preheating device 33 through a chute 32. The dried and preheated composite pellets are then supplied to a fluidized bed 35 for effecting preliminary reduction. The prereduced composite pellets discharged from the outlet port 36 of the fluidized bed are admitted into the rotary kiln through chute 21. The carbonaceous reducing agent is supplied into the rotary kiln through a hopper 37 provided at an intermediate point of the chute 21.

The composite pellets completely reduced in the rotary kiln are discharged into a cooler 38 through a chute associated with hopper 24 together with the unreacted carbonaceous reducing agent. After being sufficiently cooled in the cooler 38, the reduced pellets and the carbonaceous reducing agent are discharged through a chute 39.

Air, fuel and reducing gas are supplied as follows. A mixture of air supplied by a blower 40 and fuel oil pumped by a pump 41 is supplied to a suitable burner in a combustion chamber 42 so as to form reducing gas containing CO and $CO_2$ at a ratio of 2 : 1 or more. The resulting high temperature reducing gas is admitted into the fluidized bed 35 through a perforated plate 44 and a conduit 43. The reducing gas exhausted from the fluidized bed 35 is supplied to a cyclone separator 46 via a conduit 45. The exhaust gas from which dust has been removed enters into a heat exchanger 47. After imparting the heat to the air in a serpentine tube 48, the reducing gas is discharged through an exhaust port 49. At this stage, since the exhaust gas generally contains $SO_2$ gas, the gas is then passed through a suitable wet type desulfurization system or cooled sufficiently. As shown by dotted lines, the cooled exhaust gas is supplied into cooler 38 through an inlet 51 mounted on the end cover 50 of the cooler 38. The temperature of the exhaust gas is increased, while it flows upwardly through the chute associated with hopper 24 located at the discharge end of the rotary kiln.

Near the charge end of the cooler 38, a portion of $CO_2$ gas reacts with the carbonaceous substance to form CO.

According to another method of utilizing the exhaust gas from the discharge end 49 of the heat exchanger 47, the exhaust gas is supplied directly to the central burner 25 of the rotary kiln.

The air supplied by a blower 52 is preheated while it passes through the serpentine pipe 48 and then supplied to the central burner 25 through a pipe 53 to burn the fuel supplied to the burner. The gas produced by the flame 26 of the burner 25 is admixed with the exhaust gas passed through cooler 38. The gas formed in the combustion of the carbon in the charge by the air which is ejected through inlet ports 16 is also admixed with the above-mentioned combustion product. The mixture of these gases passes through the rotary kiln and serpentine tubes 28 and preheats the air passing through the tubes 28. Thereafter the exhaust gas is exhausted through chimney 31. The exhaust gas has been completely burned so that it does not contain any appreciable quantity of CO. The gas exhausted through the chimney 31 may be treated to remove dust and harmful components and to collect Zn or the like. Alternatively, the exhaust gas may be passed through another heat exchanger.

A portion of the preheated air is branched from pipe 53 and supplied to the casing 55 of the drier 33 through a pipe 54. If desired, the temperature of the preheated air supplied to the dryer 33 can be adjusted by the air supplied by a blower 56. The gas admitted into the drier 33 is used to preheat and dry the composite pellets conveyed by a travelling grate, and then exhausted into the atmosphere through a discharge pipe 57.

Further, a portion of the preheated air is branched from the pipe 53 through a pipe 58 and is admitted into the combustion chamber 42 for supplying thereto preheated air.

As above described, the illustrated combination of the fluidized bed and the rotary kiln has the advantage of eliminating the defect of the fluidized bed but of making the best use of the advantageous merit thereof. More specifically, where the reduction of the ore is performed completely in the fluidized bed, the temperature of the exhaust gas from the fluidized bed would be increased, and the concentration of CO gas and the volume of the exhaust gas would also be increased. Accordingly, it becomes extremely difficult to recover these vast quantities of the physical and chemical energies. However, this difficulty can be reduced to about one half, because the fluidized bed is used for the preliminary or partial reduction. Further, there is no fear of sintering, which is the most serious problem of the fluidized bed. As has been already pointed out, the transfer of heat through the bed of the charge formed in the rotary kiln is relatively slow. In this invention, however, from the standpoint of the rotary kiln, it is easy to increase the temperature thereof because preheated composite pellets are charged therein. Another advantage of the novel combination lies in the high percentage of the CO gas in the exhaust gas from the fluidized bed, that is a large chemical energy of the exhaust gas. After being cooled by the heat exchanger 47, the exhaust gas is admitted into the cooler 38 for the reduced pellets, the cooler 38 requesting a gas having a composition similar to that of the exhaust gas from the fluidized bed rather than oxidizing gas.

The heat of the exhaust gas from the fluidized bed is well recovered in the manner as above described. Recovering of the heat of the exhaust gas from the rotary kiln at the charge end of the kiln further increases the overall efficiency of the system.

The most advantageous merit of this invention is caused by the revolutionary change in the heat transfer in the rotary kiln. Although the technique of the rotary kiln was invented by Ramsun in England about 100 years ago, only the radiant heat from the inner wall of the lining could be available to heat the limited surface of the charge as shown in FIG. 1A. Of course, a small quantity of heat is conducted directly from the inner wall of the lining to the charge. However, quantity comprises only a small percentage of the total heat quantity transferred to the charge. In spite of these defects, the rotary kiln is still used because some satisfactory devices that can recover heat from the exhaust gas from the rotary kiln have been developed. Recovery of heat of exhaust gas from the rotary kiln is sufficiently conducted in the present invention. However, the present invention is essentially different from the prior art. In the present invention heat exchange in the charge, which has scarecely been conducted in the prior art, is conducted sufficiently to reduce heat escaping in the exhaust gas. Consequently, remarkable heat efficiency which was not attained only by recovery of heat from the exhaust gas is obtained.

To have a better understanding of the invention, the following examples are given but are not to be construed to limit the scope of the invention.

EXAMPLE 1.

In this example, the comparison between the so-called SL/RN process shown in FIG. 1B and the novel method will be described. The raw material had a composition of 50 percent of LD dust, 50 percent of the dust obtained by a secondary dust remover associated with a blast furnace with bentnite added to the mixture in an amount of 0.5 percent thereof. The blast furnace dust contained about 25 percent of carbon so that the carbon content of the raw material was about 12 percent. After thorough kneading of the raw material with an Eirich mixer, about 11 percent of water was added to the raw material and then the raw material was formed into pellets with a disc pelletizer. The resulting pellets were dried to a water content of about 0.5 percent. The dried pellets were charged in a rotary kiln having a length of 10 m. and an inner diameter of 0.8 m. In the case of the SL/RN process wherein a shell burner is mounted on the rotary kiln, a coal feeder was mounted on the discharge end of the rotary kiln for feeding a portion of the coal. However, in this experiment, since the quality of the composite pellets was not high, all raw materials were charged into the rotary kiln through its charging ports. Thus, the raw material was charged at a rate of 8.89 t/D of the dried pellets, 1.08 t/D of coal, and 0.30 t/D of recycled char. The number of the shell burners was six. On the other hand heavy oil was burned at a rate of 339 l/D at a burner installed at the discharge end, thus maintaining the temperature of the discharge end at a maximum value of 1,100°C. The following result was obtained.

| Pellets obtained | |
| --- | --- |
| Percentage of metallization | 96.4% |
| Metallic iron | 70.74% |
| Compression strength | 229 kg/pellet |
| Required heat quantity | 4.5 million K cal/ton of pellet |
| Production rate | 5.1 t/day |
| Temperature of the exhaust gas | 670°C |

Then a test was conducted using the same composite pellets, coal, the rotary kiln shown in FIG. 3 and the system shown in FIG. 5. During this test, the temperature at the discharge end was again maintained at a temperature of 1,100°C.

The composition of the charge was 13.62 t/D of the dried pellets, 1.47 t/D of coal, and 0.43 t/D of recycled char. The quantity of heavy oil consumed at the burner was 424 l/D and the following result was obtained.

| Pellets obtained | |
| --- | --- |
| Percentage of metallization | 95.7% |
| Metallic iron | 70.0% |
| Compression strength | 295 kg/pellet |
| Required heat quantity | 4 million K cal/ton of pellet |
| Production rate | 7.3 t/day |
| Temperature of the exhaust gas | 320°C |

In these tests, the last 2 meters of the total length of 10 meters of the rotary kiln were used for disposing the serpentine pipes of the heat exchanger. Accordingly, it would be possible to increase the production rate by at least 20 percent, if the heat exchanger were placed outside the length of the rotary kiln.

While a production rate of 5 t/D was attained by the SL/RN process which utilizes the composite pellets described above, where non-composite pellets of substantially the same raw material, that is pellets not containing coal, were used, the production rate was only 3 t/D.

At present, the maximum capacity of one unit is 600 t/D. Based on this data, when the composite pellets are used the maximum capacity can be increased to 1,000 t/D and where the novel combination system shown in FIG. 5 is used, a maximum capacity of 1,700 t/D per unit can be expected. However, this increased capacity is not sufficiently high when compared with the capacity of other facilities of the present day iron making plants. The following example shows that a capacity of 3,000 t/D can be accomplished by using the method of pretreatment using the fluidized bed as shown in FIG. 5.

EXAMPLE 2.

The process shown in FIG. 5 was performed on the same material as in Example 1. The fluidized bed used in this example had a small size, that is an inner diameter of 0.7 m and a height of 1.4 m, and the average stay time was about 7 minutes. The percent metallization attained by this fluidized bed was about 50 percent and the temperature of the exhaust gas was about 1,000°C. The following result was obtained.

| Pellets obtained | |
| --- | --- |
| Percentage of metallization | 96.5% |
| Metallic iron | 71.86% |
| Compression strength | 205 kg/pellet |
| Required heat quantity | 3.9 million K cal/ton of pellet |
| Yield | 13.8 t/D |
| Temperature of the exhaust gas | 380°C |

What is claimed is:

1. A rotary kiln for use in a direct iron reduction process, comprising:
    an outer shell;
    a perforated inner shell concentrically contained in said outer shell;
    a lining applied on the inner surface of said inner shell, at least a portion of said lining being comprised of porous bricks; and
    a plurality of partition walls for dividing the space between said inner and outer shells into a plurality of axially extending chambers for supplying oxidizing gas into the space within said lining through said porous bricks.

2. Apparatus for use in a direct iron reduction process, comprising:
    a rotary kiln including a plurality of inlet ports which are disposed to admit oxidizing gas in the circumferential direction along the inner wall of said rotary kiln, a fuel burner at one end of said rotary kiln, a heat exchanger located at the opposite end of said rotary kiln for preheating siad oxidizing gas, an inlet for partially reduced raw material pellets at said opposite end and a discharge port for the reduced pellets at said one end;
    a preheater for preheating and drying the raw material pellets;
    a fluidized bed of raw material pellets coupled between said inlet of said rotary kiln and said preheater;
    means for supplying reducing gas into said fluidized bed for partially reducing said preheated raw material pellets; and
    means for supplying the reducing gas exhausted from said fluidized bed into said rotary kiln at said one end.

3. The apparatus according to claim 2 wherein means is provided to incorporate carbonaceous substance into the partially reduced pellets between said fluidized bed and the inlet at said opposite end of the rotary kiln.

4. The apparatus according to claim 2 including means for discharging said reduced pellets into a cooler through said discharge port, and wherein said reducing gas exhausted from said fluidized bed is admitted into said rotary kiln at said one end through said cooler and said discharge port.

5. The apparatus according to claim 2 including means for supplying said reducing gas exhausted from said fluidized bed to said fuel burner of said rotary kiln.

6. The apparatus according to claim 2 including means for supplying the preheated air; preheated by said reducing gas exhausted from said fluidized bed, to said preheater for drying and preheating said raw material pellets.

7. The apparatus according to claim 2 wherein said means for supplying reducing gas into said fluidized bed comprises a fuel burner which generates CO and $CO_2$ at a ratio of 2 : 1 or more.

8. The apparatus according to claim 2 wherein said raw material pellets comprise a mixture of a powder of iron ore, and a carbonaceous substance.

9. The apparatus according to claim 8 wherein said mixture further contains a desulfurization agent.

10. A rotary kiln comprising:
    a rotatable kiln member having a cross-sectional configuration generally in the form of a toothed rachet wheel;
    a plurality of inlet ports in said kiln member for receiving oxidizing gas at the roots of the respective teeth of said rachet wheel configuration;
    a cylinder located at one end of said kiln device into which the charge is admitted, at least a portion of said cylinder being located within said kiln device; and
    a heat exchanger interposed between the inner wall of said kiln device and the outer wall of said cylinder for preheating said oxidizing gas.

11. A rotary kiln according to claim 10 including means for injecting fuel into the end of said kiln opposite from said one end, and wherein said inlet ports for admitting the oxidizing gas are situated to admit the oxidizing gas in the circumferential direction along the inner wall of said rotary kiln.

12. The apparatus according to claim 1 wherein said lining is completely formed of said porous bricks.

13. The apparatus according to claim 2 wherein said rotary kiln has a cross-sectional configuration generally in the form of a toothed ratchet wheel.

14. The apparatus according to claim 13 wherein said oxidizing gas is admitted into said kiln through said inlets at the roots of the respective teeth of said ratchet wheel.

15. The apparatus according to claim 2 wherein said inlet for said partially reduced raw material pellets includes a cylinder at least partially located within said inner wall of said rotary kiln, and said heat exchanger is at least partially located between said cylinder and said inner wall of said rotary kiln.

* * * * *